Patented Feb. 12, 1946

2,394,770

UNITED STATES PATENT OFFICE 2,394,770

ALCOHOLYSIS OF ALKAMINE ESTERS OF DIARYL HYDROXYACETIC ACIDS

Arthur J. Hill, New Haven, Conn., and Roger B. Holmes, South River, N. J., assignors to American Cyanamid Company, New York, N. Y., a corporation of Maine No Drawing. Application February 21, 1942, Serial No. 431,822

5 Claims. (Cl. 260—473)

This invention relates to an improved method of making alkamine esters of diaryl hydroxyacetic acids.

Alkamine esters of the diaryl hydroxyacetic acids are of great commercial importance. The exact properties and consequently the uses to which they may be put depend upon the substituents of the particular acid and the particular alcohol which go to make up the ester.

Unfortunately, direct esterification of diaryl hydroxyacetic acids with an aminoalcohol is so difficult to accomplish that with most aminoalcohols it is commercially impractical. In the past attempts have been made to produce the alkamine esters of some diaryl carboxylic acids by roundabout methods, usually by condensing an aminoalkanol with a halide of the acid or by reacting a halogen-alkanol ester of the acid with a secondary amine. While these reactions may be carried out with some of the acids they are complicated, relatively difficult to manipulate and in the case of the hydroxyacetic acids can not be used since the presence of the hydroxy group prevents the preparation of the necessary halide or halogen alkanol ester.

The present invention concerns a process of catalysed alcoholysis which is applicable to the hydroxy-acids, is simple, easy to manipulate, and produces commercially practical yields. Although the yields vary with the particular acid or aminoalcohol chosen, in almost every case a greater yield is obtained than with any of the previously known procedures. In many cases also the process of the present invention enables the production of compounds which previously could not be prepared by any of the known procedures.

In general the present process comprises forming an ester of the selected diaryl hydroxy acid with an alcohol which is free from amino groups and then reacting the ester with an amino alcohol in the presence of a metal alcoholate as a catalyst, whereby an ester substitution is accomplished. The alcohol produced by the reaction and any unreacted reagents are removed, generally by distillation, and the product collected as the alkamine ester base.

In accomplishing our process, the use of a metal alcoholate is very important, apparently being principally responsible for the superior yields obtained. It also appears to increase the rate of reaction. The metal alcoholate may be added to the reaction mixture as a preformed alcoholate or as a strongly basic metal which will form the alcoholate in situ. The particular metal alcoholate which is used is not so important. Metallic sodium is easily available, relatively cheap, and since it forms the alcoholate in the reaction mixture produces very satisfactory results. Other alkali metals and alloys, for example, potassium, give similar results but usually do not justify the added cost. Similar results may also be obtained with metal amides such as sodamide.

It is not desired to limit the invention to any particular theory of action as the reaction mechanism has not as yet been definitely proven. However, it is believed that the metal forms an intermediate product which is then transformed into the final product. It is definitely known that the alcoholate is regenerated. It is an additional advantage of the present invention that the amount of the metal alcoholate present in the reaction as well as its nature is not critical, and it may be used in various proportions throughout a considerable range. The optimum amounts, however, will vary somewhat with different alkamine esters.

Our invention is particularly concerned with the production of alkamine esters of hydroxyacetic acids of the general formula:

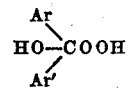

in which Ar and Ar' may be any aryl radical as for example naphthyl, phenyl or an alkyl, alkoxy or amino substituted aryl radical. Ar and Ar' need not be the same, for example Ar may be phenyl and Ar' may be tolyl. Illustrative examples of suitable acids are benzilic, anisilic, p-tolilic, phenyl-p-tolyl-hydroxyacetic, 4-ethyl-diphenyl-hydroxy-acetic, dinaphthylhydroxyacetic, and naphthylphenyl hydroxyacetic.

In forming the starting ester from the diaryl substituted acid any simple alcohol is satisfactory. The choice is not particularly important since it will be replaced later. The methyl and ethyl esters produce excellent results and as these alcohols are readily available, they are preferable. The invention however, is not limited to the use of the methyl and ethyl esters and esters of other low molecular alcohols such as propyl or isopropyl alcohol give excellent results. However, they normally will not justify the higher cost of the alcohol.

In the process of the present invention the alcohol corresponding to the starting ester used is one of the products of the reaction and this alcohol must be removed, normally by distillation. Ordinary distillation procedures may be employed after the reaction has been completed. In most cases, however, there is an advantage in removing the alcohol continuously during the reaction as this increases the speed of reaction to a very considerable extent. When the continuous distillation procedure is employed, the ester used should be one of an alcohol having a boiling point suitable for continuous distillation from the reaction mixture at the reaction temperature. The distillation may take place either at atmospheric or reduced pressure.

The present invention is generally applicable to aminoalcohols and particularly to those having a tertiary amino group. These may be represented by the formula:

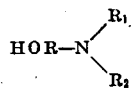

in which R is an aliphatic hydrocarbon residue and $R_1$ and $R_2$ are the same or different aliphatic or aromatic aralkyl radicals or form with the nitrogen atom a heterocyclic ring such as the piperidine or morpholine ring. The most important amino alcohols from a practical standpoint are those in which R is a straight saturated chain which may be represented by the formula:

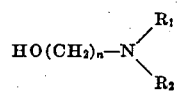

in which $n$ is a small whole number.

Typical illustrations of the amino alcohols which may be used in the present invention are dimethylaminoethanol, diethylaminoethanol, dibutylaminoethanol, diethylaminopropanol, dibutylaminopropanol, dipropylaminobutanol, dibutylaminobutanol, methylethylaminopropanol, diethylaminobutanol, methylethylaminoethanol and the like.

The choice of the particular alcohol and acid used depends upon the product it is desired to produce. Variations in the acid or alcohol produce correspondingly different products but do not affect the present reaction except as to the extent to which the reaction may be carried to completion in a reasonable time and therefore the quantity of the product practically obtainable. The temperature at which the reaction is carried out may be varied in accordance with the particular reagents selected.

The invention will be described in greater detail in conjunction with the following specific examples, which are meant to be merely illustrative and do not in any way limit the invention. The parts are by weight unless otherwise noted.

*Example 1*

β-Diethylaminoethyl benzilate-hydrochloride

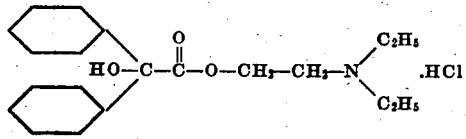

170 parts of ethylbenzilate were mixed with 170 parts of β-diethylaminoethanol in which 1 part of sodium had been dissolved. The mixture was heated for 10 hours at 150° C. and then distilled up to 165° C. which removed most of the ethanol formed and remaining β-diethylaminoethanol. Ether was added to the residue and the mixture washed with water. The ether solution was dried over sodium sulfate and then removed by distillation in a vacuum. The distillate was dissolved in sodium-dried ether and cooled in an ice bath. Dry hydrogen chloride gas was passed through the solution until precipitation was complete. The product was filtered off and purified by crystallization from acetone. The final product was in the form of white crystals melting at 170 to 171° C.

*Example 2*

γ-Diethylaminopropyl benzilate.hydrochloride

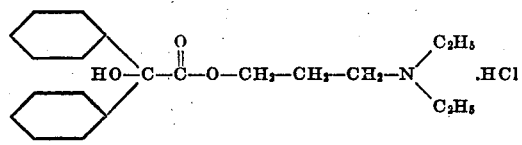

1 part of sodium was dissolved in 170 parts of γ-diethylaminopropyl alcohol and the solution added to 150 parts of ethyl benzilate. The reaction mixture was heated for a period of about 40 hours in an oil-bath at 150° C. and then distilled until the temperature reached 200° C. to remove the ethanol and the unreacted aminoalcohol. The residue was dissolved in ether and washed with water to effect a removal of any remaining amino alcohol and its sodium salt. The ethereal solution was dried over sodium sulfate. After drying the ether was removed and the residue, consisting of ethyl benzilate and γ-diethylaminopropyl benzilate, distilled at a pressure of 5 mm. The fraction distilling between 160° and 210° C. was collected and dissolved in anhydrous ether. Dry hydrogen chloride was passed into the cooled solution and the alkamine ester precipitated as the hydrochloride. In the last step an excess of hydrogen chloride was avoided, inasmuch as the hydrochloride is hygroscopic and free hydrogen chloride tends to aggravate this property. The product was filtered and crystallized from acetone. After two recrystallizations the compound melted consistently at 145–6° C.

*Example 3*

γ-Di-n-butylaminopropyl benzilate

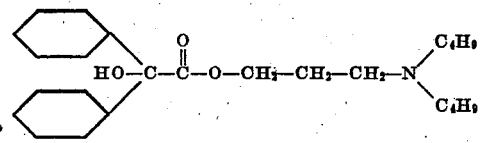

1 part of sodium was dissolved in 415 parts of γ-di-n-butylaminopropanol and mixed with 300 parts of ethyl benzilate. The mixture was heated for 48 hours in an oil-bath at a temperature of 160° C. Ethanol boiled gently during the course of the alcoholysis. After cooling, the reaction mixture was diluted with ether and the aminoester and excess amino-alcohol extracted with dilute hydrochloric acid. The aqueous extract was made alkaline with an excess of sodium carbonate, the alkamine ester extracted with ether and washed twice with water. After drying the ethereal extract and removing the ether the residue was distilled at a pressure of 6 mm. The dibutylaminopropanol distilled first at from 99°–105° C. and was recovered. The aminoester distilled from 205°–280° C. This was redistilled at 5 mm. and the fraction distilling between 225° and 230° C. was collected.

Example 4

Hydrochloride of α-di-n-butylaminopropyl benzilate

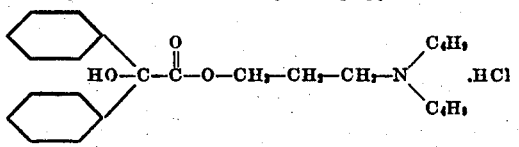

The amino-ester obtained in Example 3 was dissolved in anhydrous ether and the solution cooled in an ice-bath. Dry hydrogen chloride gas was passed over the surface of the ether while the solution was stirred. The hydrochloride precipitated as an oil which solidified after standing for a few hours in the cold. Recrystallization from an acetone-ether solution gave a pure product in the form of long, silky, white needles that melted at 115° C.

Example 5

β-Diethylaminoethyl anisilate

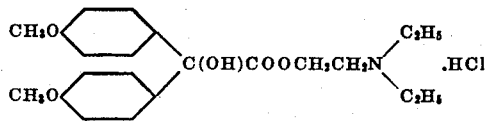

1 part of sodium was dissolved in 150 parts of β-diethylaminoethanol and added to 134 parts of ethyl anisilate. The reaction mixture was heated in an oil-bath at 150° C. for a period of 46 hours. Ethanol and excess β-diethylaminoethanol were removed by distilling until the temperature reached 170° C. The residue was dissolved in ether and washed several times with water. After drying over sodium sulfate the ether was distilled off and the residue distilled at a pressure of 3 mm. It distilled between 210° and 230° C.

Example 6

Hydrochloride of β-diethylaminoethyl anisilate

The distillate obtained in Example 5 was dissolved in anhydrous ether and the hydrochloride of the alkamine-ester was precipitated with dry hydrogen chloride in the cold. The solid was filtered off and purified by crystallization from acetone; the pure hydrochloride melted at 156–7° C.

Example 7

β-Diethylaminoethyl tolilate 250 parts of methyl tolilate and a solution of 1 part of sodium in 320 parts of β-diethylaminoethanol were heated together at 150° C. for 45 hours. The excess amino-alcohol was removed by distilling up to 170° C. Ether was then added and the amino-ester was extracted from the solution by several treatments with dilute hydrochloric acid. The acid extracts were combined and made alkaline with solid sodium carbonate. The oily alkamine ester was taken up with ether and, after washing with water was dried over anhydrous sodium sulfate. The ether was removed and the alkamine ester distilled from 200° to 218° C. at 4 mm. pressure.

Example 8

Hydrochloride of β-diethylaminoethyl tolilate

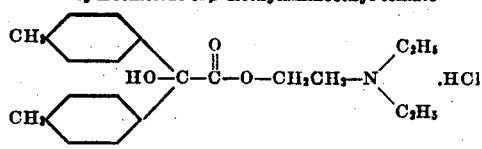

The β-diethylaminoethyl tolilate obtained in Example 7 was converted into its hydrochloride by the procedure of Example 4. The compound was extremely hygroscopic and could not be exposed to the air without becoming sticky and wet. Attempted crystallization from acetone-ether gave an amorphous product which melted at 185–90° C.

Example 9

β-Diethylaminoethyl α-methoxy-diphenylacetate

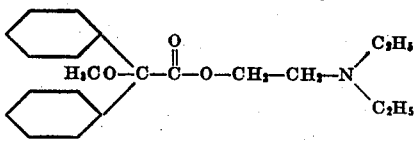

A solution of 1 part of sodium dissolved in 350 parts of β-diethylaminoethanol was added to 40 parts of methyl α-methoxy-diphenylacetate and the reaction mixture was heated in an oil-bath at 150° C. for 25 hours. The unreacted β-diethylaminoethanol was then distilled off and recovered. The residue was dissolved in ether and the alkamine ester was extracted with dilute hydrochloric acid. The acid extract was made alkaline with sodium carbonate. The ester appeared as an oil and was extracted with ether and dried over anhydrous sodium sulfate. After removing ether in the usual manner, the residue was distilled at 3 mm. The ester distilled at 112–15° C.

Example 10

Hydrochloride of β-diethylaminoethyl α-methoxy-diphenyl-acetate

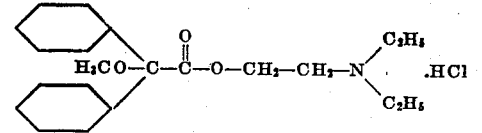

β-Diethylaminoethyl α-methoxydiphenylacetate obtained in Example 9 was dissolved in anhydrous ether and dry hydrogen chloride passed through the solution until precipitation was complete. The hydrochloride was filtered off and crystallized several times from acetone. When impure, the compound was very hygroscopic and could be handled only on cold, dry days. This unpleasant property disappeared when the product was obtained in a pure condition. It melted at 133–4° C.

Example 11

β-Diethylaminoethyl naphthilate hydrochloride

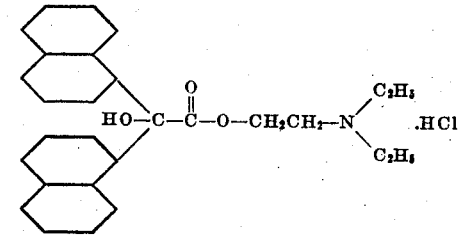

60 parts of ethyl naphthilate were added to 60 parts of β-diethylaminoethanol in which 0.4 part of metallic sodium had been dissolved and the mixture was heated on an oil-bath at 150° C. for 56 hours. The mixture was then distilled to remove the ethanol and remaining β-diethylaminoethanol. The residue was dissolved in ether, washed with water, dried over sodium sulfate, the ether distilled off and the residue distilled under a 3 mm. vacuum. The fraction distilling between 205° and 225° C. was collected, dissolved in ether and the hydrochloride was precipitated with dry hydrogen chloride in the cold as fine white crystals.

The following example is illustrative of the modification of the procedure in which the alcohol produced by the reaction is continuously removed.

*Example 12*

β-Diethylaminoethylbenzilate hydrochloride

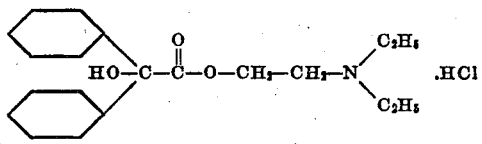

114 parts of ethyl benzilate, 175 parts of β-diethylaminoethanol and 0.2 part of metallic sodium were placed in a flask attached to a total-reflux variable take-off fractionating column. The pressure was reduced to 100 mm. and heat was applied by an oil bath the temperature of which was slowly raised to 90° C. During three hours of heating 17 parts of ethanol distilled (35.5° C.). When the distillation of the ethanol became slow, the bath temperature was raised to 120° C. When the vapor temperature indicated distillation of the amino alcohol the take-off valve was closed and the mixture was refluxed for one hour. At the end of this period the vapor temperature had dropped and two more parts of ethanol were distilled. The remaining aminoalcohol was slowly distilled for three hours. The pressure was then reduced to 20 mm. and the remainder of the aminoalcohol distilled at 66° C. During the reaction the color of the solution changed from yellow to deep red. The residue was dissolved in 500 parts of ether, washed once with dilute brine, and three times with water, dried over sodium sulfate and finally dried over calcium sulfate. 500 parts of a saturated solution of HCl in absolute ether was added and the resulting precipitate filtered. Dry HCl gas was passed into the filtrate to a slight excess and the percipitate again filtered. The combined precipitates were washed with cold acetone. The 106 parts of product was purified by recrystallization from acetone as fine white crystals which melt at 177-178° C.

*Example 13*

β-Piperdinoethyl benzilate hydrochloride

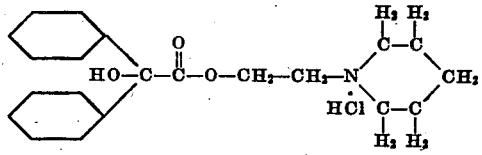

The procedure of Example 12 was repeated using 115 parts of ethyl benzilate and 175 parts of piperdinoethanol. The purified product melted at 176-177° C.

*Example 14*

β-Morpholinoethyl benzilate hydrochloride

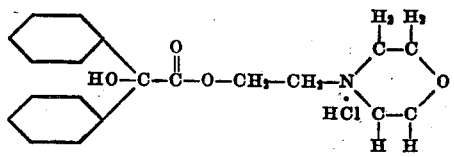

The procedure of Example 12 was repeated using 115 parts of ethyl benzilate and 150 parts of morpholinoethanol. The purified product melted at 182-183° C.

In the various examples the hydrochloride derivatives of the alkamine esters have been described since they are cheap and simple to prepare. However, if so desired other salts such as the sulfates, hydrobromides phosphates and the like may be easily prepared. Salts of strong organic acids such as tartaric or citric acid may be prepared or if desired a salt such as the hydrochloride may be converted into organic salts such as the borate or tartrate. In some cases it may be desirable to form quarternary salts such as the methoiodide or the ethobromide or benzobromide. For example, the methobromide derivative of β-diethylaminoethyl benzilate is more soluble in water than is the corresponding hydrochloride.

We claim:

1. A process of producing alkamine esters of those substituted acetic acids having the type formula:

in which X is a radical selected from the group consisting of hydrogen and the lower straight-chain alkyl radicals and Ar is an aryl radical, which comprises, heating a lower alkyl ester of the acid with a monohydric alcohol of a tertiary amine in the presence of a catalytic amount of an alkali metal alcoholate of the aminoalcohol, whereby the esterifying residue of the aminoalcohol replaces the alkyl radical of the ester, continuing the heating until the reaction reaches substantially equilibrium and isolating the resultant alkamine ester.

2. A process of producing alkamine esters of those substituted acetic acids having the type formula:

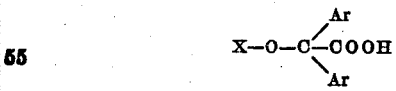

in which X is a radical selected from the group consisting of hydrogen and the lower straight-chain alkyl radicals and Ar is an aryl radical, which comprises, heating a lower alkyl ester of the acid with a monohydric alcohol of a tertiary amine in the presence of a catalytic amount of an alkali metal alcoholate of the aminoalcohol, whereby the esterifying residue of the amino-alcohol replaces the alkyl radical of the ester, continuously removing the replaced alcohol until the reaction reaches substantially equilibrium and isolating the resultant alkamine ester.

3. A process of producing alkamine esters which comprises reacting a lower alkyl ester of an α-methoxydiarylacetic acid with a slight excess of a monohydric alcohol of tertiary amine in which is dissolved a sufficient amount of an alkali metal to form a catalytic amount of alkali metal alcoholate of the aminoalcohol, whereby the esterifying residue of the aminoalcohol replaces the alkyl radical of the ester.

4. A process of producing alkamine esters which comprises reacting a lower alkyl ester of benzilic acid with a slight excess of a monohydric alcohol of tertiary amine in which is dissolved a sufficient amount of an alkali metal to form a catalytic amount of alkali metal alcoholate of the aminoalcohol, whereby the esterifying residue of the aminoalcohol replaces the alkyl radical of the ester.

5. A process of producing alkamine esters which comprises reacting a lower alkyl ester of an α-hydroxy naphthyl acetic acid with a slight excess of a monohydric alcohol of tertiary amine in which is dissolved a sufficient amount of an alkali metal to form a catalytic amount of alkali metal alcoholate of the aminoalcohol, whereby the esterifying residue of the aminoalcohol replaces the alkyl radical of the ester.

ARTHUR J. HILL.
ROGER B. HOLMES.